United States Patent
Chen et al.

(10) Patent No.: US 9,602,036 B2
(45) Date of Patent: Mar. 21, 2017

(54) MOTOR SPEED CURVE CONTROL CIRCUIT AND MOTER THEREOF

(71) Applicant: ANPEC ELECTRONICS CORPORATION, Hsinchu (TW)

(72) Inventors: Kun-Min Chen, Hsinchu (TW); Ching-Sheng Li, Hsinchu (TW); I-Lin Chiu, New Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 14/842,912

(22) Filed: Sep. 2, 2015

(65) Prior Publication Data

US 2016/0359444 A1    Dec. 8, 2016

(30) Foreign Application Priority Data

Jun. 5, 2015 (TW) .............................. 104118349 A

(51) Int. Cl.
*G05B 11/28* (2006.01)
*H02P 23/00* (2016.01)
*H02P 27/08* (2006.01)
*H02P 6/06* (2006.01)

(52) U.S. Cl.
CPC ............ *H02P 23/0004* (2013.01); *H02P 6/06* (2013.01); *H02P 27/08* (2013.01)

(58) Field of Classification Search
CPC .......... H02P 23/22; H02P 27/08; H02P 27/14; H02P 1/04; H02P 6/085; H02P 7/04
USPC .......................................................... 318/599
See application file for complete search history.

(56) References Cited

U.S. PATENT DOCUMENTS

| | | | |
|---|---|---|---|
| 2001/0022505 A1* | 9/2001 | Ohno | H02K 23/66 318/560 |
| 2008/0185987 A1* | 8/2008 | Kawakami | H02P 27/08 318/811 |
| 2011/0279072 A1* | 11/2011 | Shimizu | H02P 6/16 318/400.04 |
| 2011/0279975 A1* | 11/2011 | Shimizu | H02P 7/29 361/695 |
| 2016/0352279 A1* | 12/2016 | Mishima | H02P 27/08 |

* cited by examiner

*Primary Examiner* — Bentsu Ro
*Assistant Examiner* — Bickey Dhakal
(74) *Attorney, Agent, or Firm* — Li & Cai Intellectual Property (USA) Office

(57) ABSTRACT

The present disclosure illustrates a motor speed curve control circuit. The motor speed curve control circuit is configured for adjusting a speed of a motor according to a motor speed curve. The motor speed curve control circuit comprises a divider resistor module, an analog-to-digital converter and an arithmetic unit. The resistor module is configured for generating at least one turning-point voltage. The turning-point voltage is used to adjust a slope of the motor speed curve. The analog-to-digital converter converts the turning-point voltage to digital form. The arithmetic unit sets a speed associated with the turning-point voltage corresponding to a first preset duty cycle in the motor speed curve, such that the motor speed curve becomes linear. The arithmetic unit generates a second pulse width modulation signal according to the adjusted motor speed curve and a first pulse width modulation signal to drive the motor.

14 Claims, 6 Drawing Sheets

MOTOR SPEED CURVE CONTROL CIRCUIT AND MOTER THEREOF

BACKGROUND OF THE INVENTION

1. Field of the Invention

The instant disclosure relates to a motor speed curve control circuit; in particular, to a motor speed curve control circuit that can adjust the motor speed curve and a motor using the same.

2. Description of Related Art

With the development of technology, motors have become essential electric devices in society. The common motors, such as DC motors, AC motors, step motors and the like, have been widely used for driving fans.

In order to drive the motor, the motor driving chip comprises a Hall sensor. The Hall sensor outputs the timing signal to the control circuit according to the working state of the motor, such as the current direction and the current amount of the coil of the motor. The control circuit controls the conducting states of each switch in the full-bridge circuit according to the timing signals and the pulse width modulation signals, which makes the permanent magnet of the motor rotator and the coil attract or repel with each other. Thereby, the motor can drive the fans to rotate.

A curve drawn based on the relationship between the duty cycle of the input pulse width modulation signal and the corresponding speed thereof is considered to be the motor speed curve. For example, the vertical axis of the motor speed curve represents for the motor speed, and the horizontal axis of the motor speed curve represents for the duty cycle of the input pulse width modulation signal. The characteristics of the motor can be learned according to the motor speed curve. The motor speed curve of the traditional motor is a non-linear curve, and thus it would not be accurate enough for the control circuit to control the motor.

SUMMARY OF THE INVENTION

The instant disclosure provides a motor speed curve control circuit. The motor speed curve control circuit stores at least one motor speed curve for adjusting the speed of a motor according to the motor speed curve, wherein the motor speed curve is related to a duty cycle of a first pulse width modulation signal and the speed of the motor. The motor speed curve control circuit comprises a divider resistor module, an analog-to-digital converter and an arithmetic unit. The divider resistor module is configured to generate at least a turning-point voltage. The turning-point voltage is to adjust a slope of the motor speed curve, and the motor speed curve has a multi-stage slope. The analog-to-digital converter is connected to the divider resistor module, and configured to convert the turning-point voltage in a digital form. The arithmetic unit is connected to the analog-to-digital converter and a pulse width modulation signal generating unit. The arithmetic unit is configured to generate a second pulse width modulation signal according to the turning-point voltage and the first pulse width modulation signal output by the pulse width modulation signal generating unit. The arithmetic unit sets the speed corresponding to the turning-point voltage as the speed within a first preset duty cycle of the motor speed curve, and outputs the second pulse width modulation signal according to the adjusted motor speed curve for driving the motor.

The instant disclosure further provides a motor, and the motor comprises a motor speed curve control circuit. The motor speed curve control circuit stores at least one motor speed curve for adjusting the speed of a motor according to the motor speed curve, wherein the motor speed curve is related to a duty cycle of a first pulse width modulation signal and the speed of the motor. The motor speed curve control circuit comprises a divider resistor module, an analog-to-digital converter, an arithmetic unit and a control unit. The divider resistor module is configured to generate at least a turning-point voltage. The turning-point voltage is to adjust a slope of the motor speed curve, and the motor speed curve has a multi-stage slope. The analog-to-digital converter is connected to the divider resistor module, and configured to convert the turning-point voltage in a digital form. The arithmetic unit is connected to the analog-to-digital converter and a pulse width modulation signal generating unit, and configured to generate a second pulse width modulation signal according to the turning-point voltage and the first pulse width modulation signal output by the pulse width modulation signal generating unit. The control unit is connected to the motor speed curve control circuit, and configured to control a full-bridge circuit according to the second pulse width modulation signal output by the arithmetic unit for making the motor rotate. The arithmetic unit sets the speed corresponding to the turning-point voltage as the speed within a first preset duty cycle of the motor speed curve, and outputs the second pulse width modulation signal according to the adjusted motor speed curve for driving the motor.

To sum up, the motor speed curve control circuit and the motor using the same provided by the instant disclosure can make the motor speed curve become linear. After that, the motor speed curve control circuit adjusts the speed of the motor according to the adjusted motor speed curve. Compared with the traditional motor, the motor provided by the instant disclosure has better stability, and the speed thereof can be easily controlled.

For further understanding of the instant disclosure, reference is made to the following detailed description illustrating the embodiments and embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1:
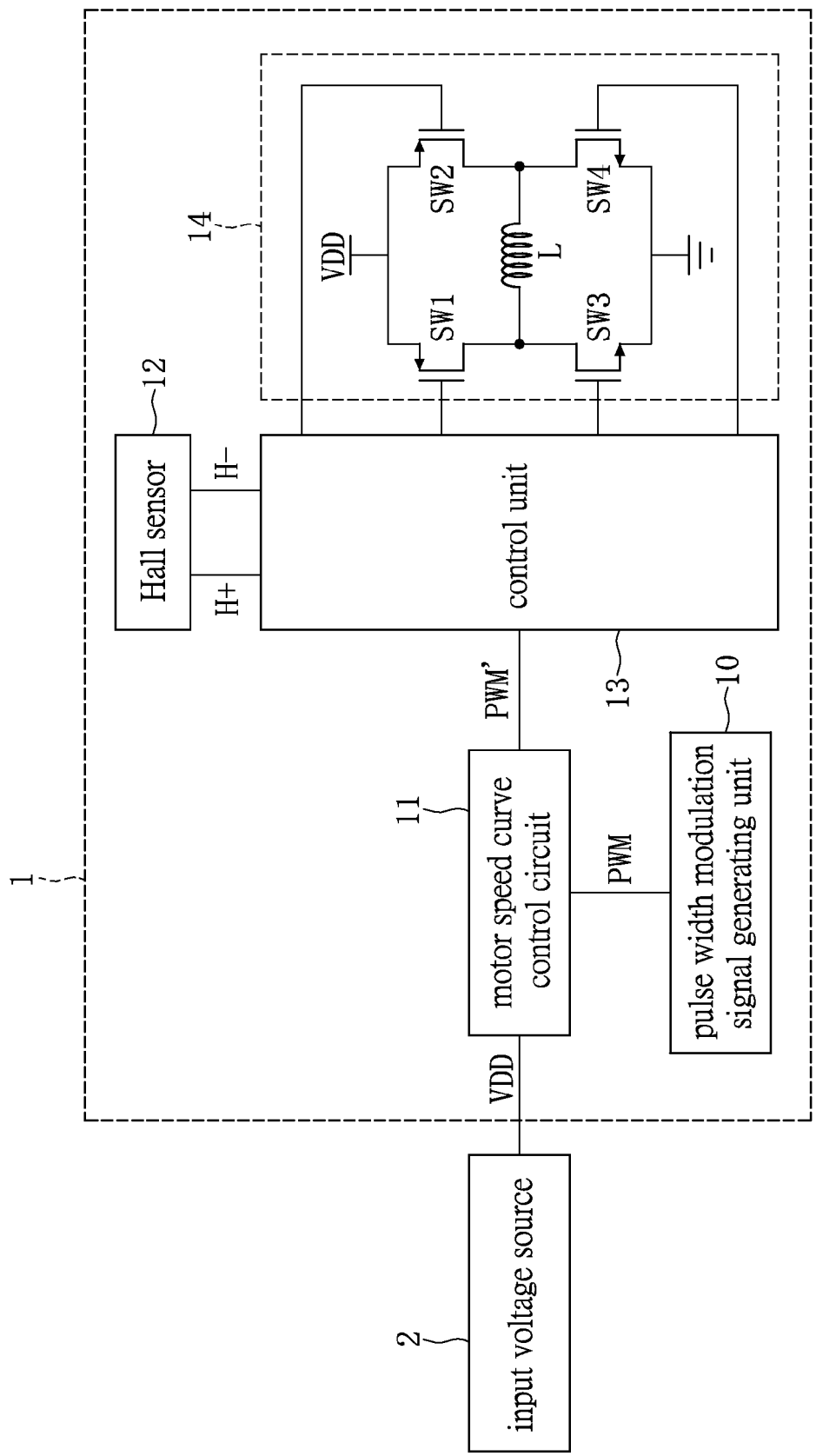
FIG. 1 shows a block diagram of a motor of one embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the instant disclosure. As used herein, the term "and/or" includes any and all combinations of one or more of the associated listed items.

FIG. 1 shows a block diagram of a motor of one embodiment of the instant disclosure. The motor 1 comprises a pulse width modulation (PWM) generating unit 10, a motor speed curve control circuit 11, a Hall sensor 12, a control unit 13 and a full-bridge circuit 14. The motor speed curve control circuit 11 is connected to an input voltage source 2, the PWM generating unit 10 and the control unit 13. The control unit 13 is connected to the Hall sensor 12 and the full-bridge circuit 14. The input voltage source 2 provides an input voltage VDD to make the motor 1 work.

The PWM generating unit 10 comprises suitable logic, circuitry, interfaces and/or code operable to output a first pulse width modulation signal PWM to the motor speed curve control circuit 11. The duty cycle of the first pulse width modulation signal PWM can be adjusted based on the system requirements.

The motor speed curve control circuit 11 comprises suitable logic, circuitry, interfaces and/or code operable to receive the first pulse width modulation signal PWM, and to adjust the speed of the motor 1 according to a motor speed curve. More precisely, the motor speed curve control circuit 11 stores at least one motor speed curve. After receiving the first pulse width modulation signal PWM, the motor speed curve control circuit 11 adjusts the duty cycle of the first pulse width modulation signal PWM according to the motor speed curve and generates a second pulse width modulation signal PWM' to drive the motor.

The Hall sensor 12 comprises suitable logic, circuitry, interfaces and/or code operable to sense the magnetic pole position of the magnetic pole in the motor rotator (not shown) of the motor 1, and to generate a first timing signal H+ and a second timing signal H−.

The control unit 13 comprises suitable logic, circuitry, interfaces and/or code operable to receive the second pulse width modulation signal PWM', the first timing signal H+ and the second timing signal H−, to control the conducting state of the full-bridge circuit 14 and further to make the motor 1 work.

The full-bridge circuit 14 comprises a first switch SW1, a second switch SW2, a third switch SW3, a fourth switch SW4 and a motor load L. The first switch SW1 and the second switch SW2 are connected to the input voltage source 2 to receive the input voltage VDD. The third switch SW3 and the fourth switch SW4 are connected to the ground terminal. A first end of the motor load L is connected to the first switch SW1 and the third switch SW3, and the second end of the motor load L is connected to the second switch SW2 and the fourth switch SW4. The gates of the first switch SW1, the second switch SW2, the third switch SW3 and the fourth switch SW4 are respectively connected to the control unit 13. Moreover, the two ends of the motor load L are further connected to the motor rotator.

In this embodiment, the first switch SW1 and the second switch SW2 are P-channel MOSFETs, and the third switch SW3 and the fourth switch SW4 are N-channel MOSFETs. The sources of the first switch SW1 and the second switch SW2 are respectively connected to the input voltage source 2, and the drains of the first switch SW1 and the second switch SW2 are respectively connected to the two ends of the motor load L. The drains of the third switch SW3 and the fourth switch SW4 are respectively connected to the two ends of the motor load L, and the sources of the third switch SW3 and the fourth switch SW4 are respectively connected to the ground terminal.

By controlling the conducting states of the first switch SW1, the second switch SW2, the third switch SW3 and the fourth switch SW4, the control unit 13 can properly decrease or increase the voltage provided to the motor rotator and further control the speed of the motor rotator.

The motor speed curve control circuit 11 can adjust the stored motor speed curve to become linear, and properly adjusts the duty cycle of the first pulse width modulation signal PWM according to an equation corresponding to the adjusted motor speed curve. After that, the motor speed curve control circuit 11 outputs the second pulse width modulation signal PWM' to the control unit 13. The control unit 13 drives the motor 1 according to the duty cycle of the second pulse width modulation signal PWM', so as to make the motor 1 work based on the adjusted motor speed curve.

In addition, the motor 1 can be used in a heat-dissipating fan or other electric device, and the use thereof is not limited herein.

Figure 2:
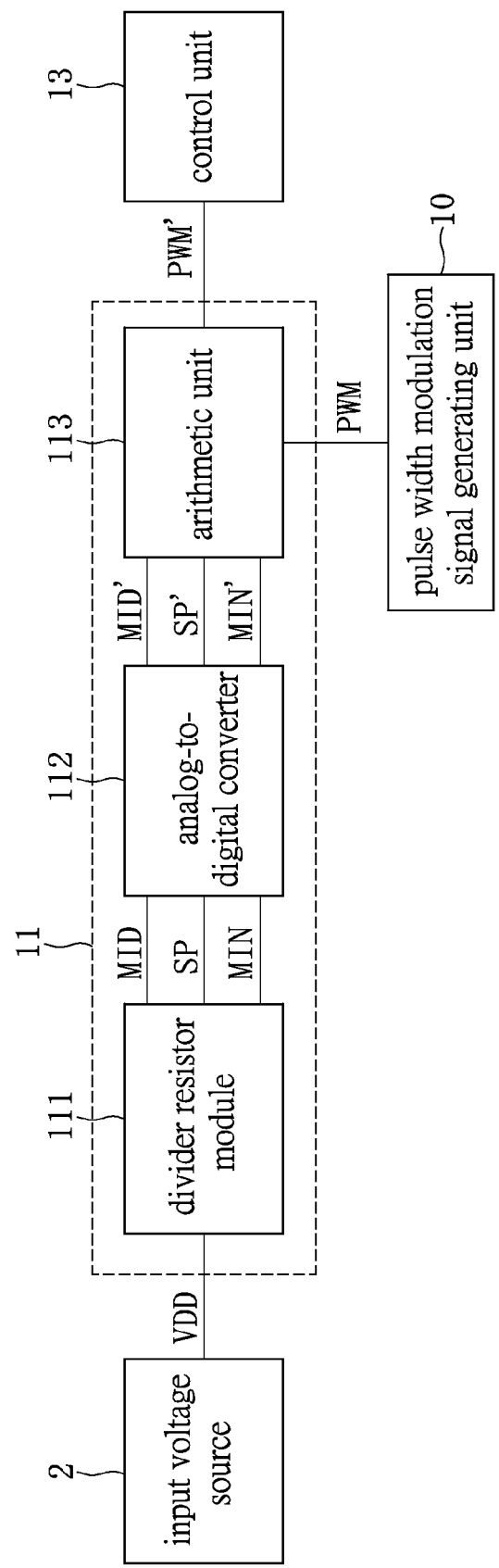
FIG. 2 shows a block diagram of a power supply of one embodiment of the instant disclosure.

The following description is to further illustrate the structure and the working principle of the motor speed curve control circuit 11. Please refer to FIG. 2. FIG. 2 shows a block diagram of a power supply of one embodiment of the instant disclosure. The motor speed curve control circuit 11 comprises a divider resistor module 111, an analog-to-digital converter 112 and an arithmetic unit 113. The divider resistor module 111 is connected to the input voltage source 2. The analog-to-digital converter 112 is connected to the divider resistor module 111 and the arithmetic unit 113. The arithmetic unit 113 is connected to the pulse width modulation signal generating unit 10 and the control unit 13.

The divider resistor module 111 comprises suitable logic, circuitry, interfaces and/or code operable to receive the input voltage VDD provided by the input voltage source and to generate a parameter voltage and at least one turning-point voltage MID. The parameter voltage is used to determine the motor speed curve. The turning-point voltage MID is used to adjust the slopes of the motor speed curve to make the motor speed curve become linear.

More precisely, the divider resistor module 111 is a resistor network composed of resistors. By designing the resistances of each resistor of the divider resistor module 111, the divider resistor module 111 can control the voltages of the parameter voltage and the turning-point voltage MID, such that the corresponding motor speed curve is generated.

The parameter voltage comprises a speed voltage MIN or a pulse width voltage SP. The speed voltage MIN is relevant to the initial speed of the motor (such as the motor 1 shown in FIG. 1) in the motor speed curve (that is, the origin of the motor speed curve on the vertical axis). The pulse width voltage SP is relevant to the initial duty cycle of the first pulse width modulation signal PWM in the motor speed curve (that is, the origin of the motor speed curve on the horizontal axis). In other words, the shape of the motor speed curve changes with the voltages of the speed voltage MIN and the pulse width voltage SP.

The resistors of the divider resistor module 111 can be designed in advance during the production process. Moreover, these resistors can be variable resistors so that the divider resistor module 111 can adjust the resistances of these resistors based on need to generate different speed voltages MN and the pulse width voltages SP.

In addition, in this embodiment, the parameter voltage comprises, for example, the speed voltage MIN or the pulse width voltage SP, but it is not limited herein. In other embodiments, the divider resistor module 111 may output other types of the parameter voltages to change the motor speed curve, for example, to adjust the angle and the phase shift of the motor speed curve. Thus, those skilled in the art can design the divider resistor module 11 based on need to make the divider resistor module 11 generate the parameter voltage.

The analog-to-digital converter 112 comprises suitable logic, circuitry, interfaces and/or code operable to convert the speed voltage MIN, the pulse width voltage SP and the turning-point voltage MID into digital voltages, and to output the speed voltage MIN', the pulse width voltage SP' and the turning-point voltage MID' in a digital form, such that the arithmetic unit 13 executes an operation according to the voltage MIN', the pulse width voltage SP' and the turning-point voltage MID' in a digital form.

The arithmetic unit 113 comprises suitable logic, circuitry, interfaces and/or code operable to receive the speed voltage MIN', the pulse width voltage SP', the turning-point voltage MID' and the first pulse width modulation signal PWM output by the pulse width modulation signal generating unit, and to adjust the stored motor speed curve. The arithmetic unit 113 generates the second pulse width modulation signal PWM' according to the adjusted motor speed curve.

More precisely, in conjunction with FIG. 2 and FIGS. 3A~3F, FIGS. 3A~3F show schematic drawings of motor speed curves of other embodiments of the instant disclosure. In the motor speed curves shown in FIGS. 3A~3F, the horizontal axis represents for the duty cycle (%) of the first pulse width modulation signal PWM input to the motor speed curve control circuit 11, and the vertical axis represents the rotation per minute (rpm).

The arithmetic unit 113 stores a plurality of motor speed curves. The motor speed curves have different shapes and slopes. When the arithmetic unit 113 receives the voltage parameters (such as the above mentioned speed voltage MIN' and the pulse width voltage SP'), the arithmetic unit 113 chooses the corresponding motor speed curve among these motor speed curves according to the voltage parameters. After that, the arithmetic unit 113 sets the speed corresponding to the turning-point voltage MID' as the speed on the vertical axis, which corresponds to a first preset duty cycle on the horizontal axis. Thereby, the adjusted motor speed curve would have linear segments having multiple-slopes. The arithmetic unit 113 adjusts the duty cycle of the first pulse width modulation signal PWM according to the adjusted motor speed curve, so as to output the second pulse width modulation signal PWM'. After the control unit 13 receives the second pulse width modulation signal PWM', the motor 1 is driven to work according to the duty of the second pulse width modulation signal PWM'.

For example, the arithmetic unit 113 stores the motor speed curves shown in the FIGS. 3A~3F. These motor speed curves have been adjusted to be linear. When the speed voltage MIN' and the pulse width voltage SP' are zero, the divider resistor module 111 does not output any voltage parameters, and the arithmetic unit 113 chooses the motor speed curve shown in FIG. 3A. After that, the arithmetic unit 113 receives the turning-point voltage MID' output by the analog-to-digital converter 112 and sets the speed corresponding to the turning-point voltage MID' as the duty cycle on the vertical axis, by corresponding it to the first preset duty cycle X1 on the horizontal axis. Thereby, the shape of the motor speed curve would be adjusted to the motor speed curve shown in FIG. 3A, and the motor speed curve would crosses the origin (0, 0).

Figure 3A:
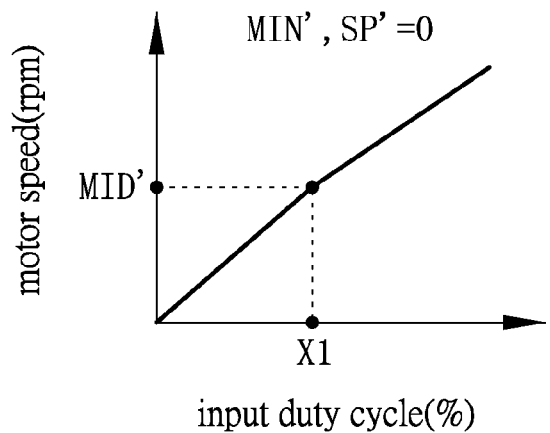
FIGS. 3A~3F shows schematic drawings of motor speed curves of other embodiments of the instant disclosure.
Figure 3B:
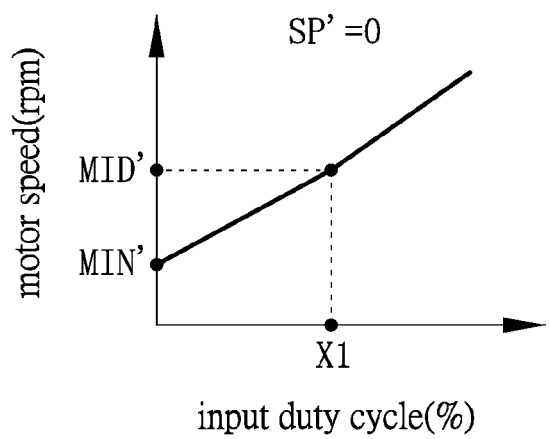

According to FIG. 3A, it is known that the motor speed curve has two-stage slopes. The turning point of the motor speed curve is known, so the arithmetic unit can calculate the two slopes of the motor speed curve via the interpolation method, and further obtain the two equations of which the motor speed curve is composed.

After obtaining the equations of the motor speed curve, the arithmetic unit 113 calculates the motor speed corresponding to the duty cycle of the first pulse width modulation signal PWM according to these equations. The arithmetic unit 113 makes the motor 1 work based on the adjusted motor speed curve according to the second pulse width modulation signal PWM'.

In addition, the motor speed is directly related to the duty cycle of the second pulse width modulation signal PWM', so the motor speed curve can also be shown by a figure showing the relationship between the duty cycle of the first pulse width modulation signal PWM and the duty cycle of the second pulse width modulation signal PWM'. In other words, the arithmetic unit 113 can directly calculate the duty cycle of the second pulse width modulation signal PWM' via the motor speed curve to drive the motor 1.

Moreover, the value of the first preset duty cycle X1 is not restricted, and those skilled in the art can design the value of the first preset duty cycle X1 based on need to make the motor speed curve become linear.

Figure 4:
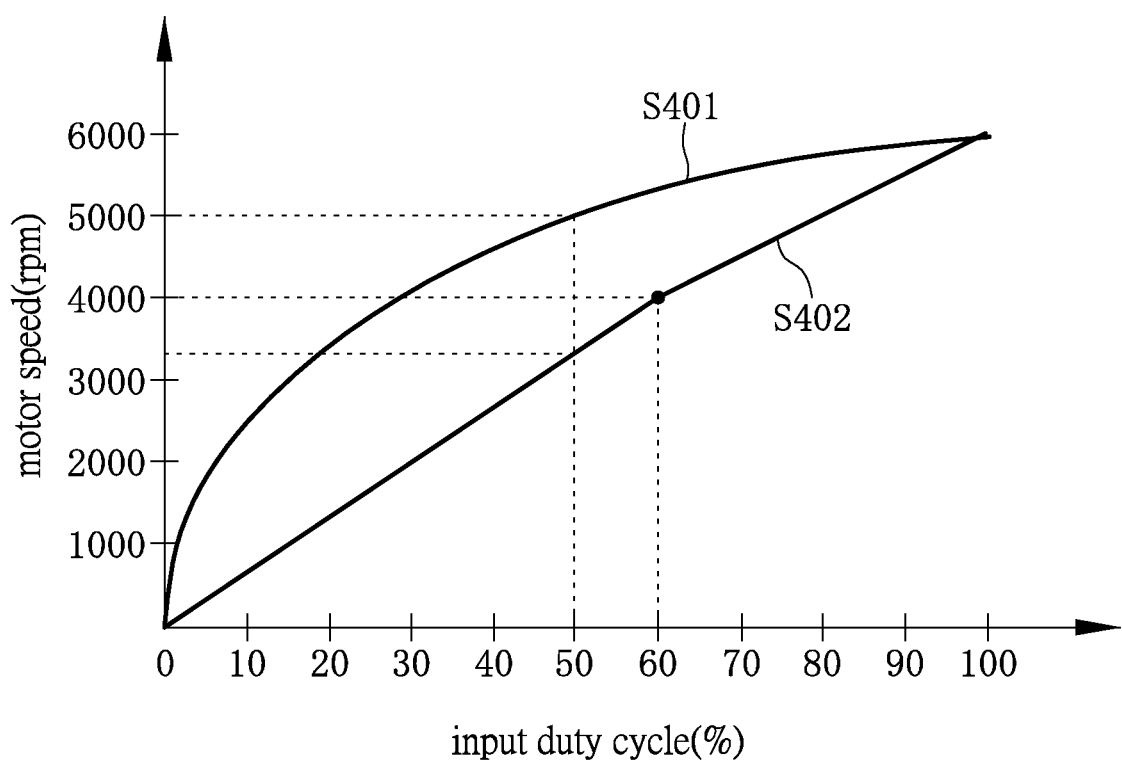
FIG. 4 shows a schematic drawing of a motor speed curve of one embodiments of the instant disclosure.

In order to further illustrate the instant disclosure, another embodiment is taken for an example in the following description. Please refer to FIG. 4. FIG. 4 shows a schematic drawing of a motor speed curve of one embodiment of the instant disclosure. The horizontal axis in FIG. 4 represents the duty cycle of the first pulse width modulation signal PWM input to the motor speed curve control circuit, and the vertical axis in FIG. 4 represents for the motor speed (rpm).

FIG. 4 provides two motor speed curves. The curve S401 is a motor speed curve corresponding to the traditional motor, and the curve S402 is a motor speed curve corresponding to the motor 1 in this embodiment. The difference between the traditional motor and the motor 1 in this embodiment is that motor 1 comprises the motor speed curve control circuit 11 to adjust the motor speed curve, such that the motor speed curve becomes linear.

In this embodiment, the speed voltage MIN' and the pulse width voltage SP' are zero, so the shape of the curve S402 is similar to the motor speed curve shown in FIG. 3A. Moreover, the first preset duty cycle X1 is 60%, and the speed corresponding to the turning-point voltage MID' is 4000 rpm. In other words, the coordinate of the turning point of the curve S402 is (60, 4000). The arithmetic unit 113 calculates a plurality of equations corresponding to the curve S402 according to the coordinate of the turning point.

When the duty cycle of the first pulse width modulation signal PWM output by the pulse width modulation signal generating unit 10 is 50%, the speed of the traditional motor is 5000 rpm. On the other hand, in this embodiment, the motor speed curve control circuit 11 tends to make the motor 1 work based on the curve S402, and the motor speed calculated according to the equation corresponding to the curve S402 and the duty cycle of the first pulse width modulation signal PWM is 3200 rpm. After that, the arithmetic unit 113 gradually adjusts the duty cycle of the second pulse width modulation signal PWM' so as to make the speed of the motor 1 reach to 3200 rpm. Thereby, the motor 1 provided by this embodiment would work according to the motor speed curve that becomes linear. Compared with the traditional motor, the motor speed curve control circuit 11 in this embodiment controls the motor 1 more precisely.

In another embodiment, as the motor speed curve shows the relationship between the duty cycle of the first pulse width modulation signal PWM and the duty cycle of the second pulse width modulation signal PWM', the arithmetic unit 113 can directly calculate the duty cycle of the second pulse width modulation signal PWM' via the motor speed curve, and make the speed of the motor 1 reache to 3200 rpm.

Please again refer to FIGS. 3A~3F. When the pulse width voltage SP' is zero but the speed voltage MIN' is larger than zero, the arithmetic unit 113 chooses the motor speed curve shown in FIG. 3B. Likewise, the arithmetic unit 113 receives the turning-point voltage MID', and adjusts the slopes of the motor speed curve according to the turning-point voltage MID', so as to make the shape of the motor speed curve adjust to be like the shape of the motor speed curve shown in FIG. 3B.

Figure 3C:
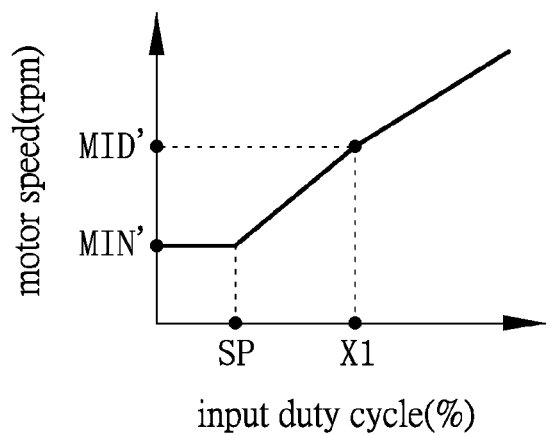

When the speed voltage MIN' and the pulse width voltage SP' are both larger than zero, the arithmetic unit 113 chooses the motor speed curve shown in FIG. 3C. Likewise, the arithmetic unit 113 receives the turning-point voltage MID', and adjusts the slopes of the motor speed curve according to the turning-point voltage MID', so as to make the shape of the motor speed curve adjust to be like the shape of the motor speed curve shown in FIG. 3C.

Figure 3D:
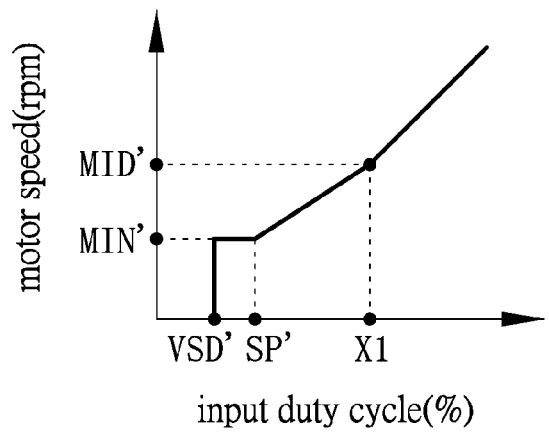

When the voltage parameters output by the divider resistor module 11, in addition to the speed voltage MIN' and the pulse width voltage SP' larger than zero, further comprise the threshold voltage VSD', the arithmetic unit 113 chooses the motor speed curve shown in FIG. 3D. The threshold voltage VSD' is related to the minimum driving threshold voltage of the motor 1. When the duty cycle of the first pulse width modulation signal PWM is smaller than the minimum driving threshold voltage, the motor 1 stops working. Likewise, the arithmetic unit 113 receives the turning-point voltage MID', and adjusts the slopes of the motor speed curve according to the turning-point voltage MID', so as to make the shape of the motor speed curve adjust to be like the shape of the motor speed curve shown in FIG. 3D.

Figure 3E:
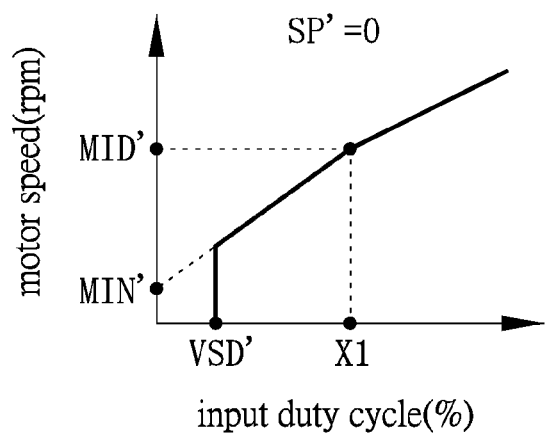

When the pulse width voltage SP' is zero, but the speed voltage MN' and the threshold voltage VSD' are larger than zero, the arithmetic unit 113 chooses the motor speed curve shown in FIG. 3E. Likewise, the arithmetic unit 113 receives the turning-point voltage MID', and adjusts the slopes of the motor speed curve according to the turning-point voltage MID', so as to make the shape of the motor speed curve adjust to be like the shape of the motor speed curve shown in FIG. 3E.

Figure 3F:
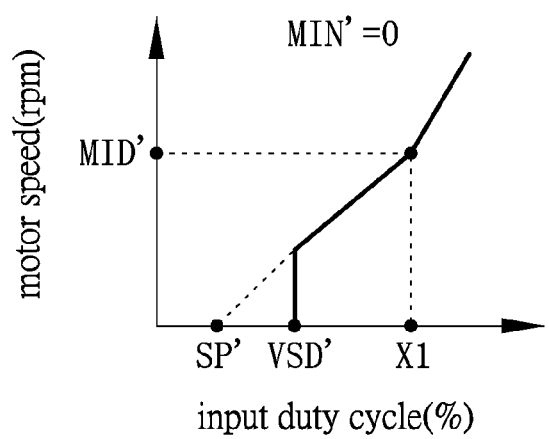

When the speed voltage MIN' is zero, the pulse width voltage SP' and the threshold voltage VSD' are larger than zero and the threshold voltage VSD' is larger than the pulse width voltage SP', the arithmetic unit 113 chooses the motor speed curve shown in FIG. 3F. Likewise, the arithmetic unit 113 receives the turning-point voltage MID', and adjusts the slopes of the motor speed curve according to the turning-point voltage MID', so as to make the shape of the motor speed curve adjust to be like the shape of the motor speed curve shown in FIG. 3F.

It should be noted that, the motor speed curves shown in FIGS. 3A~3F are taken for examples to illustrate the instant disclosure, but not to restrict the instant disclosure. Based on the above mentioned embodiments, those skilled in the art can design the motor speed curve 11 according to the instant disclosure. In other words, the arithmetic unit 113 adjusts the motor speed curve of the motor 1 to become linear according to the turning-point voltage MID' regardless of the types of the parameter voltages output by the divider resistor module 111.

Figure 5:
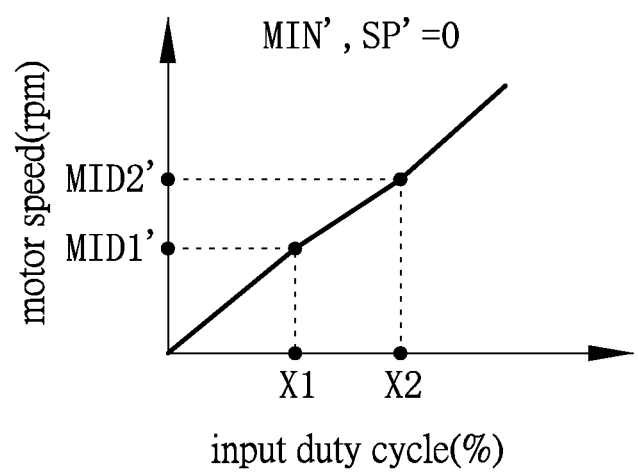
FIG. 5 shows a schematic drawing of a motor speed curve of other embodiment of the instant disclosure.

Please refer to FIG. 5. FIG. 5 shows a schematic drawing of a motor speed curve of another embodiment of the instant disclosure. In this embodiment, the pulse width voltage SP', the speed voltage MIN' and the threshold voltage VSD' are all zero. It is different form the above mentioned embodiments in that, in the embodiment shown in FIG. 5, the divider resistor module 111 outputs two turning-point voltages to the analog-to-digital converter 112.

More precisely, the divider resistor module 111 outputs a turning-point voltage MID1 and a turning-point voltage MID2. The analog-to-digital converter 112 converts the turning-point voltage MID1 and the turning-point voltage MID2 into digital voltages, and outputs the turning-point voltage MID1 and the turning-point voltage MID2 in a digital form. After that, the arithmetic unit 113 sets the speed corresponding to the turning-point voltage MID1' as the speed on the vertical axis, which is corresponded to a first preset duty cycle X1 on the horizontal axis. Also, the arithmetic unit 113 sets the speed corresponding to the turning-point voltage MID2' as the speed on the vertical axis, which is corresponded to a first preset duty cycle X2 on the horizontal axis. Thereby, the adjusted motor speed curve has a multi-stage slope, and the motor speed curve becomes linear. The control unit 13 drives the motor to work according to the adjusted motor speed curve.

It should be noted that, the divider resistor module 111 outputs two turning-point voltages, but it is not limited herein. In other embodiments, the divider resistor module 111 can be designed to output N turning-point voltages, wherein N is a positive integer larger than zero. The larger N is, the more linear the motor speed curve would be. In brief, as long as the motor speed curve can be adjusted to become linear, the number of the turning-point voltages output by the divider resistor module 111 is not restricted herein.

To sum up, the motor speed curve control circuit and the motor using the same provided by the instant disclosure can make the motor speed curve become linear. After that, the motor speed curve control circuit adjusts the speed of the motor according to the adjusted motor speed curve. Compared with the traditional motor, the motor provided by the instant disclosure has better stability, and the speed thereof can be easily controlled.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:
1. A motor speed curve control circuit, the motor speed curve control circuit storing a plurality of motor speed curves for adjusting the speed of a motor according to the motor speed curves, wherein each of the motor speed curves is related to a duty cycle of a first pulse width modulation signal and the speed of the motor, the motor speed curve control circuit comprising:
- a divider resistor module, configured to generate at least a turning-point voltage and at least a parameter voltage, wherein each of the motor speed curves has a multi-stage slope;
- an analog-to-digital converter, connected to the divider resistor module, and configured to convert the turning-point voltage in a digital form; and
- an arithmetic unit, connected to the analog-to-digital converter and a pulse width modulation signal generating unit, and configured to choose one of the motor speed curves according to the parameter voltage and then adjust a slope of the motor speed curve according to the turning-point voltage to make the adjusted motor speed curve become linear;
- wherein the arithmetic unit sets the speed corresponding to the turning-point voltage as the speed within a first preset duty cycle of the motor speed curve to make the adjusted motor speed curve become linear, and then the arithmetic unit outputs a second pulse width modulation signal according to the adjusted motor speed curve for driving the motor.

2. The motor speed curve control circuit according to claim 1, wherein the motor speed curve control circuit is connected to a control unit, and the control unit is configured to control a full-bridge circuit according to the second pulse width modulation signal output by the arithmetic unit for making the motor rotate.

3. The motor speed curve control circuit according to claim 2, wherein the full-bridge circuit comprises a first switch, a second switch, a third switch and a fourth switch, the first switch and the second switch are connected to an input voltage source, the third switch and the fourth switch are connected to a ground terminal, and the gates of the first switch, the second switch, the third switch and the fourth switch are respectively connected to the control unit, wherein the conducting states of the first switch, the second switch, the third switch and the fourth switch are related to a working state of the motor.

4. The motor speed curve control circuit according to claim 3, wherein the first switch and the second switch are P-channel MOSFETs, and the third switch and the fourth switch are N-channel MOSFETs.

5. The motor speed curve control circuit according to claim 1, wherein the parameter voltage comprises a speed voltage and a pulse width voltage, the speed voltage is related to an initial speed of the motor in the motor speed curve, and the pulse width voltage is related to an initial duty cycle of the first pulse width modulation signal in the motor speed curve.

6. The motor speed curve control circuit according to claim 5, wherein the parameter voltage comprises a threshold voltage, the threshold voltage is related to a minimum driving threshold of the motor in the motor speed curve, and when the duty cycle of the first pulse width modulation signal is lower than the minimum driving threshold, the motor stops working.

7. The motor speed curve control circuit according to claim 1, wherein the divider resistor module outputs a plurality of turning-point voltages, the arithmetic unit adjusts the slopes of the motor speed curve according to the turning-point voltages to make the adjusted motor speed curve become linear.

8. A motor, comprising:
- a motor speed curve control circuit, the motor speed curve control circuit storing a plurality of motor speed curves for adjusting the speed of the motor according to the motor speed curves, wherein each of the motor speed curve is related to a duty cycle of a first pulse width modulation signal and the speed of the motor, the motor speed curve control circuit comprising:
  - a divider resistor module, configured to generate at least a turning-point voltage and at least a parameter voltage, wherein each of the motor speed curves has a multi-stage slope;
  - an analog-to-digital converter, connected to the divider resistor module, and configured to convert the turning-point voltage in a digital form;
  - an arithmetic unit, connected to the analog-to-digital converter and a pulse width modulation signal generating unit, and configured to choose one of the motor speed curves according to the parameter voltage and then adjust a slope of the motor speed curve according to the turning-point voltage to make the adjusted motor speed curve become linear; and
- a control unit, connected to the motor speed curve control circuit, configured to control a full-bridge circuit according to a second pulse width modulation signal output by the arithmetic unit for making the motor rotate;
- wherein the arithmetic unit sets the speed corresponding to the turning-point voltage as the speed within a first preset duty cycle of the motor speed curve to make the adjusted motor speed curve become linear, and then the arithmetic unit outputs the second pulse width modulation signal according to the adjusted motor speed curve for driving the motor.

9. The motor according to claim 8, further comprising:
- a Hall sensor, connected to the control unit, configured to generate a first timing signal and a second timing signal to the control unit, such that the control unit controls the full-bridge circuit according to the first timing signal, the second timing signal and the second pulse width modulation signal.

10. The motor according to claim 8, wherein the full-bridge circuit comprises a first switch, a second switch, a third switch and a fourth switch, the first switch and the second switch are connected to an input voltage source, the third switch and the fourth switch are connected to a ground terminal, and the gates of the first switch, the second switch, the third switch and the fourth switch are respectively connected to the control unit, wherein the conducting states of the first switch, the second switch, the third switch and the fourth switch are related to a working state of the motor.

11. The motor according to claim 10, wherein the first switch and the second switch are P-channel MOSFETs, and the third switch and the fourth switch are N-channel MOSFETs.

12. The motor according to claim 8, wherein the parameter voltage comprises a speed voltage and a pulse width voltage, the speed voltage is related to an initial speed of the motor in the motor speed curve, and the pulse width voltage is related to an initial duty cycle of the first pulse width modulation signal in the motor speed curve.

13. The motor according to claim 12, wherein the parameter voltage comprises a threshold, the threshold voltage is relevant to a minimum driving threshold of the motor in the motor speed curve, and when the duty cycle of the first pulse width modulation signal is lower than the minimum driving threshold, the motor stops working.

14. The motor according to claim 8, wherein the divider resistor module outputs a plurality of turning-point voltages, the arithmetic unit adjusts the slopes of the motor speed curve according to the turning-point voltages for making the adjusted motor speed curve become linear.

* * * * *